United States Patent [19]

Erickson

[11] Patent Number: 5,382,604
[45] Date of Patent: * Jan. 17, 1995

[54] CROSSLINKED EPOXY FUNCTIONALIZED POLYDIENE BLOCK POLYMERS AND ADHESIVES

[75] Inventor: James R. Erickson, Katy, Tex.

[73] Assignee: Shell Oil Company, Houston, Tex.

[*] Notice: The portion of the term of this patent subsequent to Jul. 20, 2010 has been disclaimed.

[21] Appl. No.: 772,172

[22] Filed: Oct. 7, 1991

[51] Int. Cl.[6] ............................................... C08J 3/28
[52] U.S. Cl. .................................... 522/158; 522/170; 525/314
[58] Field of Search ................. 522/170, 158; 525/314

[56] References Cited

U.S. PATENT DOCUMENTS

| | | | |
|---|---|---|---|
| 3,341,617 | 9/1967 | Schleimer et al. | 260/680 |
| 3,551,518 | 12/1970 | Pornin | 260/836 |
| 3,555,112 | 1/1971 | Winkler | 260/83.6 |
| 3,607,977 | 9/1971 | Taylor et al. | 260/876 |
| 3,607,982 | 9/1971 | Winkler et al. | 260/880 |
| 3,652,732 | 3/1972 | Makowski et al. | 260/880 B |
| 3,699,184 | 10/1972 | Taylor et al. | 260/836 |
| 3,714,290 | 1/1973 | Blaise et al. | 260/890 |
| 3,899,474 | 8/1975 | Goldenberg et al. | 260/94.3 |
| 3,912,605 | 10/1975 | Nishio | 204/159.14 |
| 3,970,608 | 7/1976 | Furukawa et al. | 526/526 |
| 4,051,199 | 9/1977 | Udipi et al. | 260/880 R |
| 4,131,653 | 12/1978 | Hsieh et al. | 260/880 B |
| 4,131,725 | 12/1978 | Udipi | 526/526 |
| 4,135,037 | 1/1979 | Udipi et al. | 428/414 |
| 4,237,245 | 12/1980 | Halasa et al. | 525/272 |
| 4,417,029 | 11/1983 | Milkovich | 525/314 |
| 4,769,416 | 9/1988 | Gelling et al. | 525/90 |
| 4,879,349 | 11/1989 | Hoxmeier | 525/332.8 |
| 5,149,895 | 9/1992 | Coolbaugh et al. | 585/507 |
| 5,210,359 | 5/1993 | Coolbaugh et al. | 585/507 |
| 5,229,464 | 7/1993 | Erickson et al. | 525/314 |

FOREIGN PATENT DOCUMENTS

| | | |
|---|---|---|
| 0295026 | 12/1988 | European Pat. Off. . |
| 0396780A1 | 11/1990 | European Pat. Off. . |
| 0438287 | 7/1991 | European Pat. Off. . |
| 0441485A2 | 8/1991 | European Pat. Off. . |
| 219779 | 3/1985 | Germany . |
| 249029 | 8/1987 | Germany . |
| 256709 | 5/1988 | Germany . |
| 61-042504 | 3/1986 | Japan . |
| 61-136563 | 6/1986 | Japan . |
| 01115978 | 5/1989 | Japan . |

OTHER PUBLICATIONS

"New Transparent Flexible UV-Cured Films from Polyisobutylene-Polyisoprene Block Polymers", Journal of Macromolecular Sci.-Chemistry, by Puskas, Kaszas and Kennedy, vol. A28, No. 1, 1991.

Kirk-Othmer Encyclopedia of Chemical Technology, Third Edition, vol. 19, pp. 607-623, published in 1982.

"Experimental Thermoplastic Rubbers for Enhanced Radiation Cross-Linking of Hot Melt PSA's" by J. R. Erickson pub. May 1985.

Carbocationic Polymerization by Joseph P. Kennedy, pp. 82 and 138-140, published in 1982.

"Radiation Curing of PSA's Based on Themoplastic Rubbers" by D. J. Clair, Mar. 1980 Adhesives Age.

(List continued on next page.)

Primary Examiner—Marion E. McCamish
Assistant Examiner—Mark A. Chapman
Attorney, Agent, or Firm—Donald F. Haas

[57] ABSTRACT

A crosslinked adhesive composition is provided comprising an epoxidized diolefin block polymer wherein the polymer is crosslinked through at least some of the epoxy functionality. A process to prepare this polymer is also provided. The preferred polymer is partially hydrogenated and lightly epoxidized.

17 Claims, No Drawings

OTHER PUBLICATIONS

"Recent Advances in the Chemical Modification of Unsaturated Polymers", by D. N. Shulz, S. R. Turner and M. A. Golub, Rubber Chemistry and Technology 5, 1982, pp. 809–859.

"Epoxidation of Polybutadiene and Styrene-Butadiene Triblock Copolymers with Monoperoxyphthalic Acid: Kinetic and Conformation Study", by W. Huang, G. Hsiue and W. Hou, Journal of Polymer Science: Part A: Polymer Chemistry, vol. 26, 1988, pp. 1867–1883.

"Transition-Metal-Catalyzed Epoxidations", by K. A. Jorgensen, Chemical Reviews, vol. 89, No. 3, May 1989, pp. 431–457.

UV Curing: Science and Technology, Edited by S. P. Pappas, published in 1978 by Technology Marketing Corporation, pp. 23–77.

Photopolymerization of Surface Coatings, by C. G. Roffey, published in 1982 by John Wiley & Sons, pp. 41–136.

"Cationic Polymerization: Iodonium and Sulfonium Salt Photoinitiators", by J. V. Crivello, Advances in Polymer Science 62, 1985, pp. 1–48.

"UV Curing of Epoxides by Cationic Polymerization" by William R. Watt, Radiation Curing, Nov. 1986, pp. 7–25.

"Light Sources" by Vincent D. McGinnis of Battelle Columbus Laboratories.

CROSSLINKED EPOXY FUNCTIONALIZED POLYDIENE BLOCK POLYMERS AND ADHESIVES

FIELD OF THE INVENTION

This invention relates to crosslinked polymer compositions, processes to prepare them and adhesive compositions containing them.

BACKGROUND OF THE INVENTION

Curing of adhesives based on conjugated diolefins and, optionally including vinyl aromatics has increased the range of service properties for these adhesives. Radiation curing and chemical curing are known. This curing causes covalent crosslinking of the polymerized conjugated diolefins which is evidenced by a high gel content of the crosslinked polymer. Before crosslinking, the polymers are melt processable but after crosslinking, the gels can not be processed as melts. Crosslinking therefore enhances solvent resistance and improves elevated temperature shear properties. The compositions can therefore be applied to a substrate in a melt, and then crosslinked to form a superior adhesive. However, improvements in the adhesives could be made if the adhesives could be cured at lower dosages of radiation or lower levels of chemical curing agents.

Further, the known curable adhesives which are based on conjugated diolefin block copolymers do not have particularly good long term heat, weather and ultraviolet stability due to the need to utilize unhydrogenated polymers having one residual aliphatic double bond per polymerized unit. The known vinyl aromatic-conjugated diolefin block copolymer based adhesives which are curable are unhydrogenated polymers. Hydrogenation is known to improve long term heat, weather and ultraviolet stability, but it removes the double bonds which are needed to effect the curing. Such curing methods are not effective when the polymers are hydrogenated. The requirement for this unsaturation is particularly evident when typical tackifiers are present in the composition because their presence generally inhibits radiation crosslinking of the hydrogenated polymer.

It is therefore an object of the present invention to provide a crosslinked polymeric composition which is melt processable before crosslinking and has a high gel content after crosslinking. In another aspect, it is an object to provide a process to prepare this crosslinked polymeric composition. In another aspect, it is an object of this invention to provide an adhesive composition which is melt processable before crosslinking and which has a high gel content after crosslinking.

SUMMARY OF THE INVENTION

This invention provides a crosslinked polymeric composition. Before crosslinking, the composition comprises a polymer comprising diolefin monomer units and epoxy functionality. This composition is crosslinked through at least some of the epoxy functionality. According to the present invention, the crosslinking is preferably achieved by radiation curing, which may be by either ionizing or nonionizing radiation. This crosslinked polymeric composition is an excellent adhesive, sealant or coating composition either by itself or when formulated with other ingredients.

The crosslinked block polymer of this invention is preferably produced by a process comprising the steps of providing a base polymer comprising diolefin monomer units, optionally, but preferably, hydrogenating the base polymer to produce a partially hydrogenated polymer which has remaining about 0.1 to about 5 milliequivalents per gram of polymer of residual aliphatic double bonds, contacting the partially hydrogenated polymer with a peroxyacid to form an epoxidized polymer having between 0.1 and about 5 milliequivalents of epoxide per gram of polymer and exposing the epoxidized polymer to an amount of radiation energy effective to crosslink the polymer to form a crosslinked polymer having sufficient gel content to provide increased resistance to temperature or organic solvents. The polymer may also be chemically crosslinked. Preferred polymers are disclosed in copending, commonly assigned application "Viscous Conjugated Diene Block Copolymers," Ser. No. 692,839, filed Apr. 29, 1991, which is herein incorporated by reference.

The epoxidized polymer of this invention, before crosslinking, may be processed as a thermoplastic elastomer. Upon application as a film to a substrate, this polymer is crosslinked, resulting in a crosslinked adhesive having a high content of insoluble gel and a low modulus.

DETAILED DESCRIPTION OF THE INVENTION

Block polymers containing ethylenic unsaturation can be prepared by copolymerizing one or more olefins, including at least one diolefin, particularly conjugated diolefins, by themselves or with one or more alkenyl aromatic hydrocarbon monomers. The copolymers may or may not be tapered, individual blocks may be homopolymers or random copolymers, and the polymer molecule may be linear or branched, including symmetric and asymmetric radial and star branch polymers.

The polymers containing ethylenic unsaturation or both aromatic and ethylenic unsaturation may be prepared using anionic or cationic initiators or polymerization catalysts. Such polymers may be prepared using bulk, solution or emulsion techniques. In any case, the polymer containing at least ethylenic unsaturation will, generally, be recovered as a liquid or a solid such as a crumb, a powder, a pellet or the like. Polymers containing ethylenic unsaturation and polymers containing both aromatic and ethylenic unsaturation are available commercially from several suppliers.

In general, when solution anionic techniques are used, copolymers of conjugated diolefins and alkenyl aromatic hydrocarbons are prepared by contacting the monomer or monomers to be polymerized simultaneously or sequentially with an anionic polymerization initiator such as group IA metals, their alkyls, amides, silanolates, napthalides, biphenyls or anthracenyl derivatives. It is preferred to use an organo alkali metal (such as sodium or potassium) compound in a suitable solvent at a temperature within the range from about −150° C. to about 300° C., preferably at a temperature within the range from about 0° C. to about 100° C. Particularly effective anionic polymerization initiators are organo lithium compounds having the general formula:

$$RLi_n$$

wherein R is an aliphatic, cycloaliphatic, aromatic or alkyl-substituted aromatic hydrocarbon radical having from 1 to about 20 carbon atoms and n is an integer of 1 to 4.

Conjugated diolefins which may be polymerized anionically include those conjugated diolefins containing from about 4 to about 24 carbon atoms such as 1,3-butadiene, isoprene, piperylene, methylpentadiene, phenylbutadiene, 3,4-dimethyl-1,3-hexadiene, 4,5-diethyl-1,3-octadiene and the like. Isoprene and butadiene are the preferred conjugated diene monomers for use in the present invention because of their low cost and ready availability. The conjugated diolefins which may be used in the present invention include monomers which do and monomers which do not form a polymer wherein the residual aliphatic double bond is positioned between a tertiary carbon atom and a primary or a secondary carbon atom. Examples of monomers which do form such polymers including isoprene (2-methyl-1,3-butadiene), 2-ethyl-1,3-butadiene, 2-propyl-1,3-butadiene, 2-butyl-1,3-butadiene, 2-pentyl-1,3-butadiene (2-amyl-1,3-butadiene), 2-hexyl-1,3-butadiene, 2-heptyl-1,3-butadiene, 2-octyl-1,3-butadiene, 2-nonyl-1,3-butadiene, 2-decyl-1,3-butadiene, 2-dodecyl-1,3-butadiene, 2-tetradecyl-1,3-butadiene, 2-hexadecyl-1,3-butadiene, 2-isoamyl-1,3-butadiene, 2-phenyl-1,3-butadiene, 2-methyl-1,3-pentadiene, 2-methyl-1,3-hexadiene, 2-methyl-1,3-heptadiene, 2-methyl-1,3-octadiene, 2-methyl-6-methylene-2,7-octadiene (myrcene), 2-methyl-1,3-nonyldiene, 2-methyl-1,3-decyldiene, and 2-methyl-1,3-dodecyldiene, as well as the 2-ethyl, 2-propyl, 2-butyl, 2-pentyl, 2-hexyl, 2-heptyl, 2-octyl, 2-nonyl, 2-decyl, 2-dodecyl, 2-tetradecyl, 2-hexadecyl, 2-isoamyl and 2-phenyl versions of all of these dienes. Those that do not form polymers wherein the residual aliphatic double bonds are positioned between a tertiary carbon atom and a primary or a secondary carbon atom include 1,3-butadiene, piperylene, 4,5-diethyl-1,3-octadiene and the like.

Alkenyl aromatic hydrocarbons which may be copolymerized include vinyl aryl compounds such as styrene, various alkyl-substituted styrenes, alkoxy-substituted styrenes, vinyl napthalene, alkyl-substituted vinyl napthalenes and the like. Conjugated dienes can also be copolymerized with methacrylates, such as t-butyl methacrylate, as described in U.S. Pat. No. 5,002,676, which is incorporated herein by reference, and such copolymers can be partially hydrogenated and epoxidized as described herein.

Other olefins which can be used are ethylene, propylene, 1-butene, 1-pentene, 1-hexane, 1-dodecene, etc. Other examples of mono-olefins and non-conjugated olefins are given in Table 3.6 of J. P. Kennedy, E. Marechal, *Carbocationic Polymerization*, 1982 which is incorporated by reference.

In general, any of the solvents known in the prior art to be useful in the preparation of such polymers may be used. Suitable solvents, then, include straight- and branched chain hydrocarbons such as pentane, hexane, heptane, octane and the like, as well as, alkyl-substituted derivatives, thereof; cycloaliphatic hydrocarbons such as cyclopentane, cyclohexane, cycloheptane and the like, as well as alkyl-substituted derivatives thereof; aromatic and alkyl-substituted derivatives thereof; aromatic and alkyl-substituted aromatic hydrocarbons such as benzene, napthalene, toluene, xylene and the like; hydrogenated aromatic hydrocarbons such as tetralin, decalin and the like; linear and cyclic ethers such as methyl ether, methylethyl ether, diethyl ether, tetrahydrofuran and the like.

More specifically, the polymers of the present invention are made by the anionic polymerization of conjugated diene monomers and alkenyl aromatic hydrocarbon monomers in a hydrocarbon solvent at a temperature between 0° to 100° C. using an alkyl lithium initiator. The living polymer chains are usually coupled by addition of divinyl monomer to form a star polymer. Additional monomers may or may not be added to grow more branches or to terminally functionalize the polymer and the living chain ends are quenched with a proton source.

The block copolymer of this invention, which may be partially hydrogenated, initially contains residual aliphatic double bonds in the polymer. The residual aliphatic double bonds provide excellent sites for reaction with an organic peracid to form epoxide functionality in the polymer. This type of epoxide is readily cured by radiation.

Preparation of polymers which have controllable and predictable amounts of residual aliphathic double bonds is disclosed in U.S. Pat. No. 4,879,349, which is incorporated herein by reference. The process of this patent includes copolymerizing substituted and unsubstituted conjugated diolefins and then hydrogenating the copolymer under conditions which are effective to substantially hydrogenate the ethylenic unsaturation which is unsubstituted, but leave the substituted ethylenic unsaturation substantially unhydrogenated. Partial hydrogenation utilizing the process described in this patent is preferred because of the excellent controllability of the amount of residual aliphatic double bonds (ADB's). It is likely that better performance will be achieved when the catalyst disclosed in the patent is replaced by a titanium catalyst such as is disclosed in copending, commonly assigned, application Ser. No. 529,807, filed May 29, 1990 and entitled "Selective Hydrogenation of Conjugated Diolefin Polymers". Further, it is likely that better performance will be achieved if the polymerization process described in that copending application, utilizing termination of polymerization by hydrogen, is used herein.

It is preferable that the polymer be partially hydrogenated prior to epoxidation. The partial hydrogenation of the conjugated diolefin is preferably done to leave about 0.1 to about 5 milliequivalents of ADB's per gram of block copolymer, and more preferably from about 0.2 to about 2 Meq of ADB's per gram, because high values of epoxidation are neither necessary or usually desirable and residual ADB's left after epoxidation are potential sources for polymer degradation.

The epoxidized block copolymers may have weight average molecular weights of from about 3,000 to about 3,000,000. Lower molecular weights require excessive crosslinking whereas higher molecular weights are very difficult to apply to a substrate by melt or other means. More preferably, the polymer is one having a weight average molecular weight of from about 15,000 to about 2,000,000. Most preferably, the polymer is one having a weight average molecular weight of from about 40,000 to about 1,000,000 because this offers the best balance between cost, ability to use the mildest curing conditions and achieving good application behavior. It is preferred that the blocks comprising predominantly conjugated diolefin monomer units have molecular weights between about 300 and about 200,000 prior to epoxidation and, if present, the blocks comprising predominantly aromatic monomer units have molecular weights between about 500 and about 50,000 because polymers built from larger blocks are very difficult to apply and smaller blocks fail to adequately localize covalent or physical crosslinking. Molecular weights of linear polymers or unassembled linear segments of polymers such as mono-, di-, triblock, and etc., arms of star polymers before coupling are conveniently measured by Gel Permeation Chromatography (GPC), where the GPC system has been appropriately calibrated. Polymers of known molecular weight are used to calibrate and these must be of the same molecular structure and chemical composition as the unknown linear polymers or segments that are to be measured. For anionically polymerized linear polymers, the polymer is essentially monodisperse and it is both convenient and adequately descriptive to report the "peak" molecular weight of the narrow molecular weight distribution observed. Measurement of the true molecular weight of the final coupled star polymer is not as straightforward or as easy to make using GPC. This is because the star shaped molecules do not separate and elute through the packed GPC columns in the same manner as do the linear polymers used for the calibration, and, hence, the time of arrival at a UV or refractive index detector is not a good indicator of the molecular weight. A good method to use for a star polymer is to measure the weight average molecular weight by light scattering techniques. The sample is dissolved in a suitable solvent at a concentration less than 1.0 gram of sample per 100 milliliters of solvent and filtered using a syringe and porous membrane filters of less than 0.5 microns pore size directly into the light scattering cell. The light scattering measurements are performed as a function of scattering angle and of polymer concentration using standard procedures. The differential refractive index (DRI) of the sample is measured at the same wavelength and in the same solvent used for the light scattering. The following references are herein incorporated by reference:

1. *Modern Size-Exclusion Liquid Chromatography*, W. W. Yau, J. J. Kirkland, D. D. Bly, John Wiley & Sons, New York, N.Y. 1979.
2. *Light Scattering from Polymer Solutions*, M. B. Huglin, ed., Academic Press, New York, N.Y., 1972.
3. W. Kaye and A. J. Havlik, *Applied Optics*, 12, 541 (1973).
4. M. L. McConnell, *American Laboratory*, 63, May, 1978.

As stated above, it is preferred that the amount of epoxidation range between about 0.1 and about 5 milliequivalents of epoxide per gram of polymer. More preferably, it ranges from about 0.2 to about 3.0 and most preferably from about 0.2 to about 1.0. The lower ranges are most useful if the final adhesive, sealant or coating is to be very flexible and elastic after cure. The lower ranges are also best for minimizing cost and not substantially changing the hydrophobic nature or processability of the polymer. The lower ranges fit well with star block copolymers having compact structure and high molecular weight. It is preferred that, after epoxidiation, the amount of ethylenic unsaturation remaining in the copolymer be reduced to about 0.5 milliequivalents per gram or less and preferably to about 0.2 or less.

The epoxidized copolymers of this invention can be prepared by the epoxidation procedures as generally described or reviewed in the *Encyclopedia of Chemical Technology* 19, 3rd ed., 251–266 (1980), D. N. Schulz, S. R. Turner, and M. A. Golub, *Rubber Chemistry and Technology*, 5, 809 (1982), W. K. Huang, G. H. Hsuie, and W. H. Hou, Journal of Polymer Science, Part A: Polymer Chemistry, 26, 1867 (1988), and K. A. Jorgensen, Chemical Reviews, 89, 431 (1989), all of which are incorporated by reference.

For instance, epoxidation of the base polymer can be effected by reaction with organic peracids which can be preformed or formed in situ. Suitable preformed peracids include peracetic and perbenzoic acids. In situ formation may be accomplished by using hydrogen peroxide and a low molecular weight fatty acid such as formic acid. Alternatively, hydrogen peroxide in the presence of acetic acid or acetic anhydride and a cationic exchange resin will form a peracid. The cationic exchange resin can optionally be replaced by a strong acid such as sulfuric acid or p-toluenesulfonic acid. The epoxidation reaction can be conducted directly in the polymerization cement (polymer solution in which the polymer was polymerized) or, alternatively, the polymer can be redissolved in an inert solvent such as toluene, benzene, hexane, cyclohexane, methylenechloride and the like and epoxidation conducted in this new solution or can be epoxidized neat. Epoxidation temperatures on the order of about 0° to 130° C. and reaction times from about 0.1 to 72 hours may be utilized. When employing hydrogen peroxide and acetic acid together with a catalyst such as sulfuric acid, the product can be a mixture of epoxide and hydroxy ester. The use of peroxide and formic acid in the presence of a strong acid may result in diolefin polymer blocks containing both epoxide and hydroxy ester groups. Due to these side reactions caused by the presence of an acid, it is preferably to carry out the epoxidation at the lowest possible temperature and for the shortest time consistent with the desired degree of epoxidation. Epoxidation may also be accomplished by treatment of the polymer with hydroperoxides or oxygen in the presence of transition metals such as Mo, W, Cr, V and Ag.

Partial hydrogenation is diene selective. Generally, the rate of hydrogenation is much greater for carbon-carbon double bonds in which neither of the carbons is tertiary than for carbon-carbon double bonds in which one of the carbons is a tertiary carbon. The rate of epoxidation of carbon-carbon double bonds is just the opposite. Tertiary carbons promote epoxidation with peroxyacids better than secondary carbons, which in turn are better than primary carbons. Thus, polymers of the present invention are especially suitable for the processes of partial hydrogenation or epoxidation and are especially suitable for the sequential or simultaneous use of both processes on the polymer. Use of partial hydrogenation alone on the present polymers preferentially leaves a greater fraction of residual diene double bonds in the blocks of the polymers which have tertiary carbons double bonded to other carbons while use of epoxidation alone leaves a greater fraction of epoxidized diene monomers in these blocks. Generally, the partial hydrogenation is more selective to diene monomer type than epoxidation. For this reason, it is better to partially hydrogenate first and epoxidize last when both processes are used on the present polymers. The effectiveness of this approach will be seen in the examples.

In a particularly preferred embodiment, the present invention includes selective placement of epoxy groups on the polymer. Due to steric hinderance, olefinic unsaturation in which one carbon atom is tertiary hydrogenates considerably slower than olefinic unsaturation in which neither carbon atom is tertiary. Conversely, when unsaturated polymers are epoxidized by reaction with organic peracids, olefinic unsaturation in which one carbon atom is tertiary and the other is secondary epoxidizes more readily than olefinic unsaturation wherein the carbon atom pair is not a tertiary-secondary pair. This phenomenon may be utilized to place the epoxy groups at predetermined locations in a polymer by copolymerizing an alkyl substituted conjugated diolefin along with unsubstituted conjugated diolefins such that the alkyl substituted diolefins are polymerized at the locations in the polymer chain where the epoxy groups are to be preferentially placed. Either the copolymer may be partially hydrogenated and then epoxidized or the unhydrogenated copolymer may be epoxidized directly. When the unhydrogenated copolymer is epoxidized, the epoxidation may be followed by hydrogenation but this is not the preferred order of treatment.

Epoxidized polymers such as those disclosed in U.S. Pat. No. 3,699,184, incorporated herein by reference, are acceptable in the compositions of the present invention. This patent discloses block copolymers comprising at least one monoalkenyl arene block and at least one epoxidized conjugated diene block and hydrogenated derivatives of these block copolymers. The epoxidized block copolymers disclosed in '184 are preferably partially hydrogenated with the hydrogenation saturating at least 50 percent of the initial ethylenic unsaturation. At least 10 percent of the initial ethylenic unsaturation is reduced by epoxidation by contacting the polymer with a peracid. Preferably in the present invention, up to about 30 percent of the original ethylenic unsaturation is epoxidized (more precisely, up to 5 milliequivalents per gram of polymer). The example of '184 can be used to demonstrate this acceptability. Polystyrene-polybutadienepolystyrene having 15,000–68,000–15,000 molecular weight blocks was partially hydrogenated until 72% of the original 'ADB's were consumed (this means that the polymer had about 3.59 Meq of 'ADB's per gram of polymer). This polymer was epoxidized to give a polymer having about 1.63 Meq of epoxide per gram of polymer and about 1.8 milliequivalents of intact 'ADB's per gram remained.

Other epoxidized block copolymers which may be utilized in the present invention are disclosed in U.S. Pat. No. 4,135,037, incorporated herein by reference. These epoxidized block copolymers comprise at least one epoxidized conjugated diolefin block and at least one nonvinyl arene block with weight ratio of conjugated diolefins to monovinyl arenes of 45:55 to 95:5. From 5 to 80 percent of the initial olefinic double bonds are epoxidized, the epoxidation being by any known method, such as the reaction with organic peracids. As applied to the present invention, the epoxidation may be up to about 30% (not to exceed about 5 milliequivalents of epoxide per gram of polymer) and lower levels of residual unsaturation as described herein are preferred. In the examples of '037, typical polystyrenepolyisoprene-polystyrene block copolymers are shown having between about 2.33 and about 2.86 Meq of epoxide per gram of polymer.

The polymers of this invention are preferably cured by ultraviolet or electron beam radiation, but radiation curing utilizing a wide variety of electromagnetic wavelengths is feasible. Either ionizing radiation such as alpha, beta, gamma, X-rays and high energy electrons or non-ionizing radiation such as ultraviolet, visible, infrared, microwave and radio frequency may be used.

The most common sources of alpha, beta and gamma radiation are radioactive nuclei. A ionizing radiation source with commercial polymer crosslinking applications is gamma radiation that is produced from either cobalt-60 or cesium-137 radioactive nuclei. X-rays can be produced through decceleration of high speed electrons through the electric field of an atomic nucleus.

High voltage electron accelerators are preferred over gamma radiation and certain types of X-ray processing equipment. High energy electrons produced by machine acceleration, as opposed to radioisotopes, can be applied easily to industrial processes for the following reasons: easy on-off switching capability; less shielding is required than with gamma radiation; accelerator beams are directional and less penetrating than gamma or X-rays; and electron radiation provides high dose rates, i.e., maximum penetration per unit density of material, and is well suited for on-line, high speed processing applications. Commercially available high or low energy electron-processing equipment are the Dynamitron ® device, dynacote, insulating-core transformer, linear accelerator, Van de Graaff accelerator, pelletron, laddertron and linear cathode. Manufacturers of high voltage electron-accelerator equipment are High Voltage Engineering Corporation, Burlington, Mass. and Radiation Dynamics, Inc., Westbury N.Y. Manufacturers of low energy electron beam generating equipment include American International Technologies, Inc., of Torrance, Calif.; RPC industries of Hayward Calif.; and Energy Sciences of Wilmington, Mass.

Ultraviolet light sources may be based on the mercury-vapor arc. Mercury is enclosed in a quartz tube and a potential is applied to electrodes at either end of the tube. The electrodes can be of mercury, iron, tungsten or other metals. The pressure in the mercury-vapor lamp may be less than 1 atm to more than 10 atm. As the mercury pressure and lamp operating temperatures are increased, the radiation becomes more intense and the width of the emission lines increases. Other UV light sources include electrodeless lamps, Xenon lamps, pulsed Xenon lamps, Argon ion lasers and Excimer lasers.

Visible light sources can be obtained from high pressure mercury arcs by addition of rare gases or metal halides, which increase the number of emission lines in the 350–600 nm region of the spectrum. Fluorescent lamps, tungsten halide lams. and visible lasers may also be utilized.

When using non-ionizing radiation it is necessary to employ a photoinitiator to initiate the crosslinking reaction. Useful photoinitiators include diaryliodonium, alkoxy-substituted diaryliodonium, triarylsulfonium, dialkylphenacylsulfonium, and dialkyl-4-hydrophenylsulfonium salts. The anions in these salts generally possess low nucleophilic character and include $SbF_6^-$, $BF_4^-$, $PF_6^-$ and $AsF_6^-$. Specific examples include (4-octyloxyphenyl)-phenyl-iodonium hexafluoroantimonate, UVI-6990 (from Union Carbide), and FX-512 (3M Company). Bis(dodecylphenyl)iodonium hexafluoroantimonate, UVI-6974 (Union Carbide), is especially effective. The onium salts can be used alone or in conjunction with a photosensitizer to respond to long wave length UV and visible light. Examples of photosensitizers include thioxanthone, anthracene, perylene, phenothiazione, 1,2-benzathracene coronene, pyrene and tetracene. The photoinitiator and photosensitizer are chosen to be compatible with the polymer being crosslinked and the light source available.

These and other light sources, photoinitiators, and photosensitizers for cationic and combinations of free radical curing and cationic curing are described in S. P. Pappas, *UV Curing: Science and Technology*, Chapters 1–3, Technology Marketing Corp. (1978), C. G. Roffey, *Photopolymerization of Surface Coatings*, Wiley-Interscience, Chapters 2 and 3 (1982), J. V. Crivello, "Cationic Polymerization. Iodonium and Sulfonium Salt Photoinitiators," Advances in Polymer Science, 62, 1–48 (1984), W. R. Watt, "UV Curing Of Epoxies By Cationic Polymerization, Radiation Curing," Nov., 7–25 (1986), and J. V. Crivello, "Alkoxy-Substituted Diaryliodonium Salt Cationic Photoinitiators," in Rad-Tech '90-North America Proceedings, Vol. 1, 424–431 (1990), all of which are incorporated by reference.

The amount of radiation necessary for high gel formation varies with the amount of epoxy functionality, the extent to which the epoxy functionality is concentrated in specified regions, with the polymeric mass, and the type and level of photoinitiator. When curing with ionizing radiation, such as EB, a photoinitiator may be used but is not necessary. When electron beam radiation is utilized, radiation doses of about 0.1 Mrads to about 10 Mrads are acceptable, from about 0.1 Mrads to about 5 Mrads are preferred, and from about 0.1 to 2 Mrads are most preferred because of equipment cost and possible damage to substrate material. The mechanism of the radiation crosslinking without the use of an added photoinitiator is believed to be generation of cations by removal of electrons from the polymer chain by bombardment by the ionizing radiation. A cation then readily reacts with an epoxy group, if epoxy groups are available. This reaction results in an ether crosslink between two polymer molecules and a new cation site on the polymer which formerly contained the epoxy functionality. The new cation will either propagate, forming another ether crosslink with another epoxy oxygen, or terminate by recapturing an electron.

The presence of water in the polymeric composition during the radiation crosslinking is very undesirable due to the tendency of water to terminate the crosslinking. The radiation curing is therefore generally more effective if the polymeric composition is at a temperature near or above the boiling point of water at the time of the radiation curing.

Radiation induced cationic curing may also be done in combination with free radical curing. Free radical curing can be further enhanced by the addition of additional free radical photoinitiators and photosensitizers for them.

Reactive (radiation curable) diluents that can be added to the polymer include alcohols, vinyl ethers, epoxides, acrylate and methacrylate monomers, oligomers and polymers. They may also be blended with other diene-based polymers. Examples of epoxides include bis(2,3-epoxy cyclopentyl)ether (Union Carbide EP-205), vinyl cyclohexene dioxide, limonene dioxide, epoxidized soya and linseed oils and fatty acids.

The polymers may also be cured without the use of radiation by addition of a cationic initiator. Suitable initiators include the halides of tin, aluminum, zinc, boron, silicon, iron, titanium, magnesium and antimony, and the fluoroborates of many of these metals. $BF_3$ complexes such as $BF_3$-ether and $BF_3$-amine are included. Also useful are strong Bronsted acids such as trifluoromethanesulfonic (triflic acid) and the salts of triflic acid such as FC-520 (3M Company). The cationic initiator is chosen to be compatible with the polymer being crosslinked, the method of application and cure temperature. The epoxy-containing polymers may also be crosslinked by the addition of multifunctional carboxylic acids, acid anhydrides, and alcohols, and in general by the curing methods described in U.S. Pat. No. 3,970,608, which is incorporated by reference. Radiation crosslinking is preferred because reactive ingredients do not come in contact with warm adhesives.

The crosslinked materials of the present invention are useful in adhesives (including pressure sensitive adhesives, contact adhesives, laminating adhesives and assembly adhesives), sealants, coatings, films (such as those requiring heat and solvent resistance), etc. In addition to the functionalized polymer and any curing aids or agents, products formulated to meet performance requirements for particular applications may include various combinations of the following types of ingredients.

Resin

In many applications, especially in adhesives and sealants, it may be necessary to add an adhesion promoting or tackifying resin that is compatible with the rubbery midblock of the polymer. A common tackifying resin is a diene-olefin copolymer of piperylene and 2-methyl-2-butene having a softening point of about 95° C. This resin is available commercially under the tradename Wingtack® 95 and is prepared by the cationic polymerization of 60% piperylene, 10% isoprene, 5% cyclopentadiene, 15% 2-methyl-2-butene and about 10% dimer, as taught in U.S. Pat. No. 3,577,398. Other tackifying resins may be employed wherein the resinous copolymer comprises 20–80 weight percent of piperylene and 80–20 weight percent of 2-methyl-2-butene. The resins normally have softening points (ring and ball) between about 80° C. and about 115° C.

Other adhesion promoting resins which are also useful in the compositions of this invention include hydrogenated rosins, esters of rosins, polyterpenes, terpene-phenol resins and polymerized mixed olefins, lower softening point resins and liquid resins. Examples of low softening point or liquid resins include Adtac® LV, Piccolastic A5, Piccovar AP10, and Piccolyte S25 resins from Hercules. To obtain good thermo-oxidative and color stability, it is preferred that the tackifying resin be a saturated resin, e.g., a hydrogenated dicyclopentadiene resin such as Escorez® 5000 series resin made by Exxon or a hydrogenated polystyrene or polyalphamethylstyrene resin such as Regalrez® resin made by Hercules. The amount of adhesion promoting resin employed varies from about 10 to about 400 parts by weight per hundred parts rubber (phr), preferably between about 20 to about 350 phr. The selection of the particular tackifying agent is, in large part, dependent upon the specific polymer employed in the respective adhesive composition.

Optionally, an arene-block-compatible resin may be employed. Compatibility is judged by the method disclosed in U.S. Pat. No. 3,917,607. Normally, the resin should have a softening point above about 100° C., as determined by ASTM method E 28, using a ring and ball apparatus. Mixtures of arene block-compatible resins having high and low softening points may also be used. Useful resins include coumaroneindene resins, polystyrene resins, vinyl toluene-alphamethylstyrene copolymers, and polyindene resins. Much preferred is a coumarone-indene resin. The amount of arene-block-compatible resin varies from 0 to about 200 phr.

Plasticizer

The adhesive composition of the instant invention may contain plasticizers, such as rubber extending plasticizers, or compounding oils. Rubber compounding oils are well-known in the art and include both high saturates content oils and high aromatics content oils. Preferred plasticizers are highly saturated oils, e.g. Tufflo® 6056 and 6204 oil made by Lyondell and process oils, e.g. Shellflex® 371 oil made by Shell. Higher aromatic content oils include Tufflo® 11 and Shellflex® 212. The amounts of rubber compounding oil employed in the invention composition can vary from 0 to about 500 phr, preferably between about 0 to about 100 phr, and most preferably between about 0 and about 60 phr.

Filler

Various types of fillers and pigments can be included in the coating formulation. This is especially true for exterior coatings in which fillers are added not only to create the desired appeal but also to improve the performance of the coating such as its weatherability. A wide variety of fillers can be used. Suitable fillers include calcium carbonate, clays, talcs, zinc oxide, titanium dioxide and the like. The amount of filler usually is in the range of 0 to about 70% w based on the solvent free portion of the coating, depending on the type of filler used and the application for which the coating is intended. An especially preferred filler is titanium dioxide.

Solvent

If the coating will be applied from solvent solution, the organic portion of the coating will be dissolved in a solvent or blend of solvents. Aromatic hydrocarbon solvents such as toluene, xylene, or Shell Cyclo Sol 53 are suitable. If desired, it is usually possible to obtain lower viscosity by using a solvent blend consisting of an aromatic hydrocarbon solvent with a polar solvent. Suitable polar solvents include esters such as isopropyl acetate, ketones such as methyl isobutyl ketone, and alcohols such as isopropyl alcohol. The amount of polar solvent used depends on the particular polar solvent chosen and on the level of functionality on the functionalized hydrogenated block copolymer. Usually, the amount of polar solvent used is between 0 and 50% w in the solvent blend.

Stabilizer

Antioxidants and UV inhibitors can be added to the formulations to protect the products against degradation by oxidation or by exposure to sunlight during preparation and use of the compositions. Combinations of stabilizers are often more effective, due to the different mechanisms of degradation to which various polymers are subject.

The primary component of the antioxidant portion of the stabilizer package will be a hindered phenol type antioxidant. Examples of commercially available antioxidants of this type are ETHANOX 330 (from Ethyl Corporation), CYANOX 2246 (from American Cyanamid) and IRGANOX 1010 (from Ciba Geigy). A wide variety of secondary antioxidants and synergists can also be included in the formulation. Examples include zinc dialkyl dithiocarbamates such as BUTYL ZIMATE (from Vanderbilt), phosphite esters such as WESTIN 618 (from General Electric), and sulfur bearing compounds such as dilaurylthiodipropionate, CYANOX LTDP (from American Cyanamid). Antioxidants are usually used in the formulation at concentrations from about 0.05% w to about 5% w.

The UV inhibitor portion of the stabilizer package will usually be composed of a combination of a UV light absorbing type compound and a hindered amine light stabilizer. Typical absorbing type UV inhibitors include the benzophenone type such as CYASORB UV 531 (from American Cyanamid) and the benzotriazole type such as TINUVIN P and TINUVIN 328 (both from Ciba Geigy). Typical hindered amine light stabilizers include TINUVIN 770 (from Ciba Geigy) and SANDUVOR 3056 (from American Cyanamid). UV inhibitors which contain a metal, such as the nickel containing UV inhibitor, CYASORB UV 1084 (from American Cyanamid) can also be used. These UV inhibitors will generally be included in the formulation at concentrations from about 0.05% w to 10% w.

Protective pigments and fillers can also improve the resistance to degradation by exposure to sunlight. Examples include carbon black, zinc oxide and titanium dioxide.

Compositions of the present invention are typically prepared by blending the components at an elevated temperature, preferably between about 50° C. and about 200° C., until a homogeneous blend is obtained, usually less than three (3) hours. Various methods of blending are known to the art and any method that produces a homogeneous blend is satisfactory. The resultant compositions may then preferably be used in a wide variety of applications. Alternatively, the ingredients may be blended into a solvent.

Adhesive compositions of the present invention may be utilized as many different kinds of adhesives' for example, laminating adhesives, pressure sensitive adhesives, tie layers, hot melt adhesives, solvent borne adhesives and waterborne adhesives in which the water has been removed before curing. The adhesive can consist of simply the epoxidized polymer or, more commonly, a formulated composition containing a significant portion of the epoxidized polymer along with other known adhesive composition components. A preferred method of application will be hot melt application at a temperature around or above 100° C. because hot melt application above 100° C. minimizes the presence of water and other low molecular weight inhibitors of cationic polymerization. The adhesive can be heated before and after cure to further promote cure or post cure. Radiation cure of hot adhesive is believed to promote faster cure than radiation cure at room temperature.

Preferred uses of the present formulation are the preparation of pressure-sensitive adhesive tapes and the manufacture of labels. The pressure-sensitive adhesive tape comprises a flexible backing sheet and a layer of the adhesive composition of the instant invention coated on one major surface of the backing sheet. The backing sheet may be a plastic film, paper or any other suitable material and the tape may include various other layers or coatings, such as primers, release coatings and the like, which are used in the manufacture of pressure-sensitive adhesive tapes. Alternatively, when the amount of tackifying resin is zero, the compositions of the present invention may be used for adhesives that do not tear paper and molded goods and the like.

EXAMPLES

The following block polymers were prepared for use in these examples.

Polymer 1. A linear triblock polymer having two polystyrene endblocks and a midblock of random polyisoprene/polybutadiene was prepared in a mixture of cyclohexane and diethyl ether by anionic polymerization. For every one mole of active initiator (sec-butyl lithium), about 71 moles of styrene, 78 moles of 1,3-isoprene/575 moles of 1,3-butadiene and 72 moles of styrene were added and polymerized successively, and the polymer was terminated with methanol. The molar ratios correspond to the given % by weight composition. The peak molecular weight of the polymer, measured by GPC, was about 52,000. The polymer contained 12.7 milliequivalents of aliphatic double bonds per gram of polymer, of which about 1.5 milliequivalents per gram were from polymerized isoprene units.

|  | weight % |
| --- | --- |
| polystyrene | 29.0 |
| polyisoprene | 10.4 |
| polybutadiene | 60.6 |

The polymer was then partially hydrogenated using a nickel-aluminum catalyst under conditions that will not hydrogenate aromatic double bonds but will preferentially hydrogenate residual aliphatic double bonds from polymerized butadiene units and the catalyst and the residual lithium were washed out. The hydrogenation catalyst was made by the reaction of nickel octoate and triethylaluminum and was used at 15 ppm nickel, on a solution basis, at a pressure of 700 psi. The polymer was recovered by hot water coagulation and dried. NMR analysis provided the following estimate of the residual aliphatic double bonds. From the table it is apparent that the butadiene units were preferentially hydrogenated.

| NMR Results | Weight % | Meq ADB/g polymer |
| --- | --- | --- |
| styrene | 28.7 | 0.00 |
| 1,4-isoprene (intact) | 3.3 | 0.48 |
| 3,4-isoprene (intact) | 3.2 | 0.47 |
| 1,4-butadiene (intact) | 1.4 | 0.26 |
| 1,2-butadiene (intact) | 0.0 | 0.00 |
| saturates | 63.4 | 0.00 |
| Total | 100.0 | 1.21 |

Polymer 2. A portion of the above partially hydrogenated polymer was dissolved in cyclohexane and epoxidized at 45° C. using a solution of peracetic acid from FMC Corp according to the recipe below, using a stirred reactor flask, a 30 minute peracetic acid addition and 6 hour hold. The sodium carbonate was added in two steps, first half was added prior to the peracetic acid addition and the other half was added midway in the peracetic acid addition. The polymer was water washed repeatedly to remove all traces of acid, a small amount of antioxidant (BHT) was added, the polymer was coagulated with isopropanol, and dried at 40° C. in a vacuum oven. The peak molecular weight, determined by GPC, was 53,000.

| polymer, g | 311.60 |
| --- | --- |
| cyclohexane, g | 3116.00 |
| sodium carbonate, g | 5.32 |
| peracetic acid solution, g | 232.71 |

The amount of epoxy was measured by the direct titration with perchloric acid (0.1N) and quarternary ammonium halogenide (tetraethylammonium bromide) where the sample was dissolved in methylene chloride. The epoxy titration is described in *Epoxy Resins Chemistry and Technology*, edited by Clayton A. May, and published in 1988 (p. 1065) which is herein incorporated by reference. 0.82 milliequivalents of epoxide per gram of polymer were found. The residual aliphatic double bonds were determined by NMR.

| NMR Results | Weight % | Meq ADB/G polymer |
| --- | --- | --- |
| styrene | 28.7 | 0.00 |
| 1,4-isoprene (intact) | 0.3 | 0.04 |
| 3,4-isoprene (intact) | 0.8 | 0.12 |
| 1,4-butadiene (intact) | 0.1 | 0.02 |
| 1,2-butadiene (intact) | 0.1 | 0.02 |
| saturates | 70.0 | 0.20 |
| Total | 100.0 | 0.20 |

Polymer 3 was a triblock polymer having polystyrene end blocks and a polybutadiene midblock, where only the midblock was fully hydrogenated. The polystyrene content was 29% by weight. The peak molecular weight determined by GPC was 53,000 and the residual butadiene double bond content was 0.06 Meq/g of polymer as determined by NMR.

Polymer 4 was an epoxidized asymmetric armed star polymer which had certain characteristics of a polymer mixture. Specifically, analysis revealed that it was a mixture of a pure asymmetric star component which had been partially hydrogenated and epoxidized, and a pure linear (unattached arm) component which was substantially fully hydrogenated and consequently accepted little or no epoxidation. The pure star component of Polymer 4 was about 77% by weight, and the pure unattached linear arm component was about 23% by weight, as determined using GPC analysis. Overall, Polymer 4 contained about 0.40 Meq of epoxy per gram of polymer, as determined by epoxy titration, and no residual aliphatic double bonds, as determined by NMR. The weight average molecular weight of Polymer 4 was between about 1.3 and about 1.8 million. The polymer was prepared by anionic synthesis of two types of living linear polymers, i.e., a living polyisoprene arm having a molecular weight of about 38,000 and a living polystyrene-polyisoprene diblock arm having a molecular weight of about 52,000, where the molecular weight of the polystyrene block was about 11,000. The total amount of polystyrene in the polymer was about 5.7% by weight. The asymmetric polymer was formed by coupling with a commercial mixture of divinylbenzene (DVB-55 from Dow). The polymer was partially hydrogenated to give a polymer containing only about 0.59 Meq/g of residual aliphatic double bonds from 1,4-isoprene units and about 0.03 Meq/g from 3,4-isoprene units, as determined by NMR. GPC analysis after partial hydrogenation showed that the unattached linear arm component consisted of about 12% hydrogenated polyisoprene arms and about 11% by weight polystyrene-(hydrogenated) polyisoprene arms. The polymer was epoxidized with peracetic acid, washed and recovered by coagulation and drying.

Polymer 5 was a fully hydrogenated styrene-butadiene-styrene triblock copolymer having a molecular weight of about 89,000 and a 13% polystyrene content. Hydrogenation had reduced the ethylenic unsaturation to less than 0.2 Meq/g of ethylenic unsaturation.

EXAMPLE 1

A sample of Polymer 2 and a sample of Polymer 3 were each dissolved in toluene and cast onto sheets of 1 mil Mylar to result in about a 3 mil layer of dry polymer. The samples were predried in an oven for 5 minutes at 300° F. to remove any moisture and then treated with electron beam radiation at 3, 5, and 7 Mrads. The polymer films were then measured for gel content by soaking in toluene for 24 hours and measuring the undissolved polymer to determine the extent of cure and their inherent solvent resistance. This test is described in the article "Experimental Thermoplastic Rubbers for Enhanced Radiation Crosslinking of Hot Melt PSA's" published in the May 1985 Hot Melt Symposium of TAPPI which is herein incorporated by reference. Table 1 lists the gel contents (measure of solvent resistance) of the compositions after each level of irradiation. Neither polymer has solvent resistance before exposure to the electron beam radiation.

TABLE 1

| Composition | % gel content | | |
|---|---|---|---|
| | 3 Mrad | 5 Mrad | 7 Mrad |
| Polymer 2 | 30 | 67 | 100 |
| Polymer 3 | 0 | 0 | 0 |

This example demonstrates the high gel content which can be achieved by irradating the lightly epoxidized hydrogenated block copolymer according to the present invention. Polymer 2 could be crosslinked to a useful level of gel content with only 5 Mrad of radiation. The lack of gel content of the irradiated Polymer 3, which was not epoxidized, demonstrated the inability of hydrogenated polymers to crosslink when exposed to radiation if the polymers are not epoxidized.

EXAMPLE 2

Polymer 2 and Polymer 3 were incorporated into pressure sensitive adhesive compositions 2A and 2B having the compositions listed in Table 2.

TABLE 2

| Composition | 2A | 2B |
|---|---|---|
| Polymer 2 | 45.00 | 0 |
| Polymer 3 | 0 | 45.00 |
| Escorez ® 5380[1] | 43.41 | 43.41 |
| Shellflex ® 371[2] | 11.59 | 11.59 |
| Irganox ® 565[3] | 0.25 | 0.25 |
| Polygard ® HR[4] | 0.50 | 0.50 |

[1]hydrogenated tackifying agent from Exxon
[2]a process oil from Shell
[3]an antioxidant from Ciba Geigy
[4]an antioxidant from Uniroyal Adhesive compositions 2A and 2B were dissolved in toluene and cast onto 1 mil Mylar sheets to give about 1.6 mils of dry adhesive. The adhesive films were irradiated with 7 Mrad of electron beam radiation and then the gel content and resistance to shear (holding power) at 95° C. using a 1 square inch overlap and a 1 kilogram weight were determined. The gel contents and holding powers are listed in Table 3.

TABLE 3

| | % gel | | 95° Holding Power Adhesive | |
|---|---|---|---|---|
| | 0 Mrad | 7 Mrad | 0 Mrad | 7 Mrad |
| 2A | 0 | 67% | 13 min | 571 min |
| 2B | 0 | 0 | 22 min | 30 min |

The adhesive composition incorporating the epoxidized block copolymer showed solvent resistance and good high temperature holding power after being irradiated at 7 Mrads. The composition containing the hydrogenated and nonepoxidized polymer did not form gel after being irradiated and gave unacceptable high temperature shear resistance before and after irradiation.

EXAMPLE 3

Polymer 4 was dissolved in toluene and cast onto 1 mil Mylar sheet to result in about 3 mils of dry polymer. Test sheets 3A through 3F were cast from this polymer coated Mylar sheet. The test sheets were then baked for 5 minutes at 300° F. to remove any casual water and were electron beam cured at varying dosages of radiation. The % gel contents were measured and are included in Table 4.

TABLE 4

| Test Sheet | Radiation Dose, Mrad | % Gel |
|---|---|---|
| 3A | 0 | 0 |
| 3B | 0.5 | 71 |
| 3C | 1 | 73 |
| 3D | 2 | 78 |
| 3E | 3 | 79 |
| 3F | 5 | 80 |

From Table 4, it can be seen that a high gel content was achieved with as little as 0.5 Mrads of electron beam radiation, where about 92% of the epoxidized star molecules in Polymer 4 were incorporated into the crosslinked network.

EXAMPLE 4

Polymer 4 was formulated with a series of common ingredients used in making adhesives with styrene-diolefin block copolymers to make 3 samples of adhesive compositions. Polymer 5 was formulated with the same ingredients for comparative purposes. Table 5 lists the compositions of each series of compositions. Formulations 4D and 4H are simply the neat polymer dissolved in a solvent. They were used only to compare gel formation. Gel content and ability to hold in shear at 95° C. were then determined and the results are below in Table 6.

TABLE 5

| | 4A | 4B | 4C | 4D | 4E | 4F | 4G | 4H |
|---|---|---|---|---|---|---|---|---|
| Polymer 4 | 50 | 50 | 50 | 100 | 0 | 0 | 0 | 0 |
| Polymer 5 | 0 | 0 | 0 | 0 | 50 | 50 | 50 | 100 |
| Escorez ® 5380 | 50 | 0 | 0 | 0 | 50 | 0 | 0 | 0 |
| Wingtack ® 95[1] | 0 | 50 | 0 | 0 | 0 | 50 | 0 | 0 |
| Shellflex ® 371 | 0 | 0 | 50 | 0 | 0 | 0 | 50 | 0 |

[1]a tackifying resin from Goodyear

TABLE 6

| | % Gel | | | | | | 95° C. Holding Power, Min. | | | | | |
|---|---|---|---|---|---|---|---|---|---|---|---|---|
| Dose, Mrads | 0 | .5 | 1 | 2 | 3 | 4 | 0 | .5 | 1 | 2 | 3 | 5 |

TABLE 6-continued

| | % Gel | | | | | | 95° C. Holding Power, Min. | | | | | |
|---|---|---|---|---|---|---|---|---|---|---|---|---|
| 4A | 0 | 66 | 71 | 79 | 81 | 81 | 68 | >1000 | >1000 | >1000 | >1000 | >1000 |
| 4B | 0 | 0 | 64 | 67 | 74 | 68 | 113 | 360 | >1000 | >1000 | >1000 | >1000 |
| 4C | 0 | 0 | 56 | 78 | 73 | 55 | 0 | 20 | 116 | 541 | 199 | 146 |
| 4D | 0 | 59 | 72 | 75 | 73 | 73 | — | — | — | — | — | — |
| Dose, Mrads | 0 | 9.5 | 14.3 | 19 | | | 0 | 9.5 | 14.3 | 19 | | |
| 4E | 0 | 0 | 0 | 0 | | | 25 | 18 | 41 | 20 | | |
| 4F | 0 | 0 | 0 | 0 | | | 54 | 42 | 30 | 40 | | |
| 4G | 0 | 0 | 8 | 0 | | | 0 | 0 | — | 0 | | |
| 4H | 0 | 26 | 51 | 65 | | | — | — | — | — | | |

Sample 4C failed in 95° C. holding power by adhesive failure to the Mylar substrate because of the Shellflex ® 371 is a plasticizing oil and is used as an additive at low levels in adhesives because of its detrimental effect on holding power. This sample demonstrates the effect of the plasticizing oil on the curing of the composition, but 4C is not an acceptable adhesive composition due to the high level of plasticizer present.

This example demonstrates the superiority of a hydrogenated epoxidized block copolymer over a conventional hydrogenated block copolymer in simple adhesive formulations that are to be improved by use of electron beam readiation. The data also shows that the presence of tackifying resin and plasticizer affect the cure requirements to a small extent.

When a conventional hydrogenated block copolymer, Polymer 5, is utilized, the tackifying resins and plasticizing oil severely interfere with the cure. Without the plasticizer or tackifying resin, the composition formed some gel upon irradiation, although the amount of gel was insufficient to result in an acceptable adhesive composition.

It is also evident from Table 6 that electron beam radiation does not increase the high temperature holding power of compositions when the electron beam radiation does not induce gel formation. This conclusion is reached by comparing the holding powers of compositions 4E, 4F and 4G with those of the irradiated compositions. The irradiation did not significantly increase the holding power of the compositions. Conversely, when electron beam radiation induces covalent curing, the high temperature holding power is dramatically increased as can be determined by comparing the holding powers of irradiated compositions 4A and 4B with the holding power of the same compositions which were not exposed to irradiation.

Polymer 6 was a star polymer having polyisoprene and polybutadiene blocks was prepared by anionic polymerization in cyclohexane. For every one mole of active initiator (sec-butyl lithium), about 75 moles of 1,3-isoprene, 519 moles of 1,3-butadiene, 10 moles of 1,3-isoprene and 6 moles of divinylbenzene mixture were polymerized successively. A small amount of 1,2-diethoxyethane was added to the polymer solution just before the addition of the butadiene monomer for the purpose of polymerizing the butadiene to a high 1,2 configuration. The polymer was terminated with methanol. The molar ratios correspond to the given % by weight composition for the polymer. Based on composition, the polymer contained about 17.4 Meq of aliphatic double bonds per gram of polymer. The peak molecular weight of the polyisoprene-polybutadiene-polyisoprene arms prior to coupling with the DVB, as measured by GPC, was about 33,000. NMR analysis on the arms prior to DVB coupling indicated that the first polyisoprene blocks contained about 10% of their isoprene mers in the 3,4 configuration and about 90% in the 1,4 configuration, the polybutadiene blocks contained about 81% of their butadiene mers in the 1,2 configuration and about 19% in the 1,4 configuration and the last isoprene blocks had about 36% of their mers in the 3,4 configuration and about 64% in the 1,4 configuration.

| | weight % |
|---|---|
| polyisoprene | 14.7 |
| polybutadiene | 81.0 |
| polyisoprene | 2.0 |
| DVB mixture | 2.3 |

Polymer 7. A portion of Polymer 6 was partially hydrogenated using a nickel-aluminum catalyst under conditions that do not hydrogenate aromatic double bonds and will preferentially hydrogenate aliphatic double bonds of the butadiene mers, and the catalyst and the residual lithium were washed out. The hydrogenation catalyst was made by the reaction of nickel octoate and triethylaluminum, and was used at 13 ppm nickel, on a solution basis, at a pressure of 500 psi.

NMR analysis provided the following approximate composition of the residual aliphatic double bonds.

| NMR Results | Meq/g |
|---|---|
| 1,4 isoprene (intact ADB) | 0.63 |
| 3,4 isoprene (intact ADB) | 0.08 |
| 1,4 butadiene (intact ADB) | 0.62 |
| 1,2 butadiene (intact ADB) | 0.06 |
| Total | 1.39 |

Polymer 8. A portion of the above partially hydrogenated polymer solution was epoxidized at 45° C. using a solution of peracetic acid from FMC Corp. according to the recipe below, using a stirred reactor flask, a 60 minute peracetic acid addition time and a 6 hour hold. The sodium carbonate was added in two steps. After the 6 hour hold, sufficient sodium carbonate was added to neutralize all the acetic and any residual peracetic acid in the reaction flask, the polymer solution was thoroughly washed with water and the solvent was separated from the polymer by drying.

| Epoxidation | |
|---|---|
| polymer, g | 275 |
| solvent (mostly cyclohexane), g | 1762 |
| sodium carbonate, g | 4.07 |
| peracetic acid solution, g | 188 |

NMR analysis on the polymer gave the following approximate breakdown of residual aliphatic double bonds left and the approximate amount of epoxide formed.

| NMR Results | Meq/g |
|---|---|
| 1,4-isoprene (intact ADB) | 0.03 |
| 3,4-isoprene (intact ADB) | 0.01 |
| 1,4-butadiene (intact ADB) | 0.02 |
| 1,2-butadiene (intact ADB) | 0.04 |
| ADB Total | 0.10 |
| epoxy group | 1.23 |
| ADB + epoxide Total | 1.33 |

The titrated value found for the amount of epoxide in polymer 8 was about 1.01 Meq/g. The molecular weight of Polymer 8 was about 600,000.

EXAMPLE 5

Polymer 8 was used to make formulations 5A, 5B, 5C, and 5D. Formulation 5A is just neat polymer with a small amount of antioxidant added while formulation 5B included 25% of the tackifying resin Escorez® 5380 (Exxon). These formulations were intended for EB curing. Formulations 5C and 5D are similar to 5A and 5B respectively, except that 1% UVI-6974 photoinitiator (Union Carbide) was added to facilitate UV cure.

| Formulation | 5A | 5B | 5C | 5D |
|---|---|---|---|---|
| Polymer 20023-5A | 99.7 | 74.8 | 98.7 | 74.0 |
| Escorez ® 5380 | 0.0 | 24.9 | 0.0 | 24.7 |
| UVI-6974 | 0.0 | 0.0 | 1.0 | 1.0 |
| Irganox ® 1010 | 0.3 | 0.3 | 0.3 | 0.3 |

Formulations 5A and 5B were dissolved in toluene and cast onto sheets of 1 mil Mylar to give about 3 mil layers of dry formulation after solvent evaporation. Formulations 5C and 5D were dissolved in a 75/25 weight % mixture of toluene/n-butanol and similarly cast. Immediately before irradiating the film samples, the samples were preheated in an oven for 2 minutes at 149° C. to remove any moisture and simulate having just been hot melt coated. EB irradiation was done on an ESI CB-150 processor using 165 Kev electrons. UV irradiation was done on a Linde PS-2000 Laboratory Photocure unit having a single medium pressure Hg bulb delivering UV radiation from 188 nm to 365 nm, aluminum reflectors and a variable speed carrier belt. UV dose was controlled by varying the conveyor speed, which has a 60 fpm maximum and by inserting a filter. The filter prevents UV irradiation below about 300 nm from reaching the test product. This grossly reduces the incidence of UV energy that overlaps the absorbance spectrum of the UVI-6974 photoinitiator. For both EB and UV curing, a nitrogen blanket was used to suppress ozone formation and its consequent discharge into the working environment. Curing involves a cationic mechanism which is known not to be inhibited by oxygen. The formulations were tested for polymer gel content (solvent resistance) and other properties of a high performance PSA adhesive. The results are given in Table 7.

TABLE 7

Electron Beam Cure
% Polymer Gel Content

| does, Mrads | Formulation | |
|---|---|---|
| | 5A | 5B |
| 0 | 0 | 0 |
| 1 | 85 | 81 |
| 2 | 88 | 86 |

| | Polymer Gel Content (%) | | 95° C. Holding* Power to Mylar (minutes) | | Rolling Ball Tack (cm) | | Polyken Probe Tack (Kg) | | 180° Peel from steel (pli)** | |
|---|---|---|---|---|---|---|---|---|---|---|
| UV Cure - no filter | | | | | | | | | | |
| Formulation: line speed, fmp¹ | 5C | 5D | 5C | 5D | 5C | 5D | 5C | 5D | 5C | 5D |
| no dose | 0 | 0 | 0 cohesive failure | 0 | cohesive failure | | | | 1.7 cohesive failure | 2.7 |
| 60 | 95 | 100 | >1000 | >1000 | 3 | 3 | .8 | .9 | 1.2 | 2.5 |
| 40 | 97 | 100 | >1000 | >1000 | 3 | 4 | .6 | .8 | 1.2 | 2.3 |
| 20 | 99 | 100 | >1000 | >1000 | 2 | 3 | .6 | 1.2 | 1.0 | 2.1 |
| UV Cure With Use of a Filter | | | | | | | | | | |
| Formulation: line speed, fmp¹ | 5C | 5D | 5C | 5D | 5C | 5D | 5C | 5D | 5C | 5D |
| 60 | 86 | 95 | >1000 | 500 | 1 | 4 | .8 | 1.2 | 2.6c | 4.0c |
| 40 | 92 | 94 | >1000 | >1000 | 2 | 3 | .6 | .9 | 1.3c | 2.7 |
| 20 | 98 | 98 | >1000 | >1000 | 3 | 2 | .6 | 1.0 | 0.9 | 2.1 |

*1 square inch overlap with a 1 Kg mass.
**pli = pounds per linear inch.
c = slight cohesive failure.
1 fpm = feet per minute The results in Table 7 show that polymer 8 can be cured to high gel contents at low doses of EB or UV irradiation. In formulations 5A and 5B, the polymer was cured to over 80% gel with just 1 Mrad of EB irradiation. In formulations 5C and 5D, the polymer was fully cured with a single pass under the unfiltered UV bulb at 20, 40 and 60 fpm, which was the maximum speed available on the UV processing unit. Even when using the filter to prevent UV light with a wavelength less than about 300 nm from reaching the test specimen, formulation 5C was fully cured at 20 fpm and formulation 5D was fully cured at 40 fpm. PSA testing of formulations 5C and 5D show that without curing the formulations lack sufficient cohesive strength to be useful as pressure sensitive adhesives. However, PSA testing of the UV cured samples shows that formulation 5C (the polymer) or, better yet, formulation 5D (the tackifying resin-containing polymer) are excellent adhesives having sufficient cohesive strength to allow good tack properties (rolling ball tack and Polyken probe tack), clean peeling (180° peel from steel) and provide high temperature shear resistance (95° C. holding power to Mylar.

Polymer 9. A (polyisoprene-polybutadiene)n divinylbenzene star polymer was prepared in cyclohexane containing a small amount of diethyl ether cosolvent by the well known anionic polymerization method. For about every one mole of active initiator (sec-butyl lithium), 4.5 moles of 1,3-isoprene, 65 moles of 1,3-butadiene and 3.8 moles of technical divinylbenzene were added and polymerized successively, and the polymer was terminated with methanol. The technical divinyl benzene was DVB-55 from Dow, which consists primarily of mixed isomers of divinylbenzene and ethylvinylbenzene. The molar ratios correspond to the given % by weight composition for the polymer.

|  | weight % |
|---|---|
| butyl group | 1.3 |
| polyisoprene | 7.1 |
| polybutadiene | 80.4 |
| DVB-55 mixture | 11.2 |

Therefore, a (A-B)nY polymer had been produced where A was polyisoprene, B was polybutadiene, and Y was DVB. The peak diblock arm molecular weight, as determined by GPC, was about 3900. Thus, the polyisoprene block had a molecular weight of about 370 and consisted of one terminal butyl group and about 4 to 5 isoprene mers. The polybutadiene block had a molecular weight of about 3500 and consisted of about 65 butadiene mers.

Polymer 10. The above polymer solution of Polymer 9 was partially hydrogenated using a nickel-aluminum catalyst under conditions that will not hydrogenate aromatic double bonds but will preferentially hydrogenate aliphatic double bonds of butadiene mers, and the catalyst and the residual lithium were washed out. The hydrogenation catalyst was made by the reaction of nickel octoate and triethylaluminum, and was used at 15 ppm nickel, on a solution basis, at a pressure of 700 psi. A portion of the polymer was dried. NMR analysis provided the following composition of residual double bonds.

| NMR Results | Weight % | Meq. ADB/g polymer |
|---|---|---|
| 1,4 isoprene (intact ADB) | 3.5 | 0.51 |
| 3,4 isoprene (intact ADB) | 1.2 | 0.18 |
| 1,4 butadiene (intact ADB) | 1.2 | 0.22 |
| 1,2 butadiene (intact ADB) | 0.1 | 0.02 |
| other (hydrogenated mers DVB) | 94.0 |  |
|  | 100.0 | 0.93 |

Thus, the partially hydrogenated polymer had A blocks which each consisted of one butyl group, and on average, about 3 isoprene mers with their residual ADB intact and about 1.5 hydrogenated isoprene mers. The B blocks, on average, each contained about 1 butadiene mer with its ADB intact and about 64 hydrogenated butadiene mers. The weight average molecular weight, Mw, of the partially hydrogenated polymer was as measured by static light scattering. Dry polymer was dissolved in tetrahydrofuran and filtered through a 0.5 and a 0.2 micron filter. The analysis wavelength was 632.8 nm, the temperature was 25.0° C. and the DRI was 0.0884. The Mw determined was 85,000. Dividing this Mw, less the DVB contribution, by the diblock peak molecular weight of about 3900 plus the small contribution due to hydrogenation, indicated that the star had about 19 diblock arms, n=19.

Polymer 11. The above partially hydrogenated polymer in solution was epoxidized with a solution of peracetic acid from FMC Corp. After neutralization with base and water washing, the polymer solution was poured out into a shallow pan and dried to recover the neat polymer. The polymer was found to be slightly more viscous after epoxidation than before. The polymer was analyzed by NMR to determine the number and type of residual double bonds.

| NMR results: | Weight % | Meq ADB/g polymer |
|---|---|---|
| 1,4 isoprene (intact) | 0.3 | 0.04 |
| 3,4 isoprene (intact) | 0.6 | 0.09 |
| 1,4 butadiene (intact) | 0.1 | 0.02 |
| 1,2 butadiene (intact) | 0.0 | 0.00 |
| other (aliphatic, DVB) | 99.0 |  |
|  | 100.0 | 0.15 |
| Meq/g for epoxide (from epoxide titration) |  | 0.70 |

Thus, the A blocks each contained, on average, about 0.6 isoprene mers with their residual ADB intact and each B block contained little or no mers with their residual ADB intact. Hence, it can be inferred that the average A blocks contained a butyl group, about 2.4 epoxidized isoprene mers, and about 1.4 hydrogenated isoprene mers, while the average B block contained about 1.0 epoxidized butadiene mer and about 64 hydrogenated butadiene mers. Overall, each polymer molecule contained about 66 epoxide groups and about 13 residual aliphatic double bonds. The amount of epoxy was also measured by the direct titration. This method indicated that each polymer molecule contained about 60 epoxide groups.

EXAMPLE 6

Polymer 11 is a gooey, viscous liquid at room temperature that has little internal (cohesive) strength. However, it is very easy to either warm melt or solution apply the neat polymer or the compounded polymer as a thin film to a substrate. Upon crosslinking through the epoxide groups, the polymer gains considerable cohesive strength without becoming brittle or inflexible and can be used to make useful pressure sensitive adhesives having high temperature service properties and solvent resistance as shown below. Formulating the epoxidized polymer 11.

| PSA formulation | 6A | 6B | 6C | 6D | 6E | 6F |
|---|---|---|---|---|---|---|
| Polymer | 99.2 | 74.4 | 49.6 | 99.7 | 74.8 | 49.9 |
| Regalrez ® 1094 | 0.0 | 24.8 | 49.6 | 0.0 | 24.9 | 49.8 |
| Irganox ® 1010 | 0.3 | 0.3 | 0.3 | 0.3 | 0.3 | 0.3 |
| FC-520 | 0.5 | 0.5 | 0.5 | 0.0 | 0.0 | 0.0 |
|  | 100.0 | 100.0 | 100.0 | 100.0 | 100.0 | 100.0 |

Regalrez ® 1094 resin is a hydrogenated high softening point tackifying resin from Hercules, Irganox ® 1010 antioxidant is a phenolic antioxidant from Ciba-Geigy and FC-520 is a solution of a salt of triflic acid from 3M Company.

Formulations 6A–6C were dissolved in toluene and cast onto Mylar film and the solvent was allowed to evaporate. About 1.5 mil dry films of a gooey material were obtained. The films were placed in an oven and baked at 149° C. for 20 minutes to convert the gooey films into useful pressure sensitive adhesives which have good cohesive strength. The polymer gel content of each of the films was measured. The results below show that the polymer crosslinks well.

| Formulation | Polymer gel content, % |
|---|---|
| 6A | 86 |
| 6B | 100 |
| 6C | 65 |

Formulations 6D–6F, which have no FC-520 catalyst in them, were similarly dissolved and cast onto Mylar and dried. They were given a short bake to simulate being hot melt extruded and were then treated under a nitrogen blanket with electron beam radiation using 165 kev electrons. Without EB treatment the films remain a gooey liquid having no gel content or other desirable properties. However, upon EB treatment they formed useful pressure sensitive adhesives (PSA) which have good cohesive strength. The polymer gel content results given below were obtained.

| Formulation | Polymer gel content, % Dose, Mrad | | | |
|---|---|---|---|---|
| | 0 | 3 | 5 | 7 |
| 6D | 0 | 57 | 95 | 100 |
| 6E | 0 | 53 | 69 | 78 |
| 6F | 0 | 48 | 67 | 73 |

The following results were obtained upon PSA testing of formulation 6B that was baked for 20 minutes at 149° C. and formulation 6E that was EB cured with 5 Mrads. A commercial high temperature, high performance automotive grade masking tape was run as a control.

| | 6B | 6E | Commercial Tape |
|---|---|---|---|
| 95° C. Holding Power to Mylar, min (1 in * 1 in * 500 g) | >1000 | >1000 | 621 |
| 23° C. Holding Power to Steel, min (1 in * 1 in * 500 g) | >4000 | >4000 | >4000 |
| 23° C. Polyken Probe Tack, grams | 760 | 520 | 340 |
| 23° C. 180 Peel from Steel, pli | 1.2 | 1.2 | 2.1 |

This illustrates that formulations of the present invention have properties similar to or better than the high performance commercial product.

I claim:

1. A radiation crosslinked epoxidized diolefin block polymer wherein the polymer contains from 0.2 to 1.0 milliequivalents (Meq) of epoxide per gram of polymer before crosslinking and is crosslinked through at least some of the epoxy functionality by exposure to radiation and has sufficient gel content to provide increased resistance to temperature and/or organic solvents.

2. An adhesive composition comprising the polymer of claim 1.

3. A sealant composition comprising the polymer of claim 1.

4. A coating composition comprising the polymer of claim 1.

5. The polymer of claim 1 wherein the polymer is partially hydrogenated such that only from about 0.1 to about 5 milliequivalents (Meq) of aliphatic double bonds per gram of polymer remain in the polymer.

6. The polymer of claim 5 wherein the polymer is a block copolymer comprising at least one block which comprises predominantly conjugated diolefin monomer units and at least one block which comprises predominantly monovinyl aromatic monomer units.

7. The polymer of claim 6 wherein the blocks comprising predominately conjugated diolefin monomer units have molecular weights of between about 300 and about 200,000 and the blocks comprising predominantly monovinyl aromatic monomer units have molecular weights of between about 500 and about 50,000.

8. The polymer of claim 7 wherein the conjugated diolefin is selected from the group consisting of butadiene and isoprene and the monovinyl aromatic monomer is styrene.

9. The polymer of claim 5 wherein about 0.5 Meq or less of aliphatic double bonds per gram of polymer remain in the polymer after epoxidation.

10. An adhesive composition comprising the polymer of claim 5.

11. A sealant composition comprising the polymer of claim 5.

12. A coating composition comprising the polymer of claim 5.

13. A process for the preparation of radiation crosslinked epoxidized diolefin block polymers comprising the steps of:
   a) providing a polymer comprising monomer units of at least one conjugated diolefin;
   b) epoxidizing the polymer such that the polymer has from 0.2 to 1.0 Meq per gram of polymer; and
   c) exposing the epoxidized polymer to radiation energy of an intensity and for a time sufficient to result in a crosslinked polymer which is crosslinked through at least some of the epoxy functionality.

14. The process of claim 13 wherein the epoxidation is carried out by contacting the polymer with peracid in a solution with an inert solvent.

15. The process of claim 13 wherein the epoxidation is carried out by contacting the polymer with peracid in a melt of the polymer.

16. The process of claim 13 wherein the radiation energy is ionizing radiation and no photoinitiator is used.

17. The process of claim 16 wherein the ionizing radiation is electron beam radiation.

* * * * *